INVENTORS
HARRY W. JOBES
and
GEORGE A. SMITH
BY Strauch, Nolan & Neale
ATTORNEYS Feb. 1, 1966   H. W. JOBES ET AL   3,232,073
HEAT PUMPS Filed Feb. 28, 1963   3 Sheets-Sheet 2

INVENTORS
HARRY W. JOBES
and
GEORGE A. SMITH
BY *Strauch, Nolan & Neale*
ATTORNEYS

INVENTORS
HARRY W. JOBES
and
GEORGE A. SMITH
BY *Strauch, Nolan & Neale*
ATTORNEYS United States Patent Office 3,232,073
Patented Feb. 1, 1966

3,232,073
HEAT PUMPS
Harry W. Jobes and George A. Smith, Tampa, Fla., assignors to Hupp Corporation, Cleveland, Ohio, a corporation of Virginia
Filed Feb. 28, 1963, Ser. No. 261,678
11 Claims. (Cl. 62—471)

The present invention relates to refrigeration cycles employing mechanical compressors and is particularly concerned with novel stabilizing means for automatically modulating the effective charge of refrigerant circulating in a refrigeration system and with a novel method of utilizing the stabilizing means to accurately charge a refrigerant system and to check the amount of refrigerant charge in the system.

Examples of refrigeration cycles employing mechanical compressors are air conditioning systems, heat pump systems, and the like. It will be understood, however, that the present invention is not limited to application in heat pumps and air conditioners.

Conventional heat pumps of the type to which this invention particularly relates comprises indoor and outdoor coils or heat exchangers connected in a closed refrigerant circuit. Refrigerant is circulated through the coils by a compressor which draws the refrigerant from one coil, compresses the refrigerant and delivers the compressed refrigerant through the other coil where it is condensed and passes through a means for expansion, such as a capillary tube or expansion valve, to the first coil for evaporation. The system includes suitable changeover valve mechanisms for reversing the functions of the indoor and outdoor heat exchangers permitting the indoor exchanger to function as an evaporator for summertime cooling or as the condenser for winter time heating, the outdoor coil performing the opposite function.

One of the shortcomings of prior art refrigeration systems and particulary heat pumps of the type described above is their incapability to achieve uniformly optimum evaporator performance for both heavy and light evaporator operating loads. Maximum efficiency of an evaporator is attained by maintaining the refrigerant stream leaving the evaporator in a saturated gaseous state so that the entire heat transfer surface of the evaporator is subjected to heat absorption by vaporization. With this ideal condition, therefore, the refrigerant absorbs latent heat in the evaporator and no sensible heat to raise its temperature following vaporization with the result that the maximum available refrigerating effect is obtained.

In prior art constructions, if a sufficient charge of refrigerant were introduced into the system to achieve this ideal condition at maximum operating load, all of the liquid refrigerant would not vaporize at light loads and there would be an objectionable spill-over of unvaporized refrigerant into the compressor suction conduit. This liquid spill-over is objectionable from the standpoint that it would subject the compressor to damage since standard forms of refrigerant compressors are primarily for compressing vapor and, at best, a mixture of vapor and small tolerable amounts of liquid.

As a result, it has become an almost universal practice in the refrigeration industry to size evaporator coils with an excessive amount of surface and to attempt to meter delivery of refrigerant to the evaporator in order to assure that the refrigerant leaving the evaporator is in an expanded and superheated gaseous state. In passing superheated gases through part of the evaporator, however, the most efficient use of the evaporator surface is not achieved since anly the sensible heat of the refrigerant is employed in this part of the evaporator in place of latent heat desired.

One of major objects of the present invention, therefore, is to provide a novel stabilizer assembly for obtaining a uniformly efficient operation of the evaporator regardless of variations in the evaporator operating load.

More specifically, it is an object of the present invention to achieve uniformly optimum evaporator performance by utilizing novel stabilizer means which is responsive to load variations to remove a portion of the refrigerant charge from circulation during light operating loads and to restore needed portions of the removed charge to circulation upon resumption of heavier operating loads.

Another object of the present invention is to provide a novel apparatus for preventing harmful amounts of liquid refrigerant carry-over from the evaporator from entering the suction side of the compressor.

A further object of the present invention is to provide a novel stabilizer assembly for obtaining the foregoing objectives without harmful and undesirable side effects such as causing a depletion of compressor crankcase oil by trapping and accumulating liquid refrigerant containing a proportion of admixed oil.

In another of its important objectives, the present invention is directed to a novel method and/or apparatus for accurately charging a refrigerant system and for checking a charge already in the system. In this aspect, the novel charging and checking method and/or apparatus of the present invention overcomes prior difficulties in charging systems having relatively low internal volumes such as, for example, capillary metering tube systems requiring a critical charge in order to achieve satisfactory operation.

Thus, it is a further object of the present invention to provide a method and/or apparatus for charging a refrigeration system with refrigerant and also of checking a refrigerant charge in a system which is appreciably more accurate and simple in comparison to previously known methods and apparatus.

Further objects of the invention will appear as the description proceeds in connection with the appended claims and the annexed drawings wherein:

Figures 1, 1A:
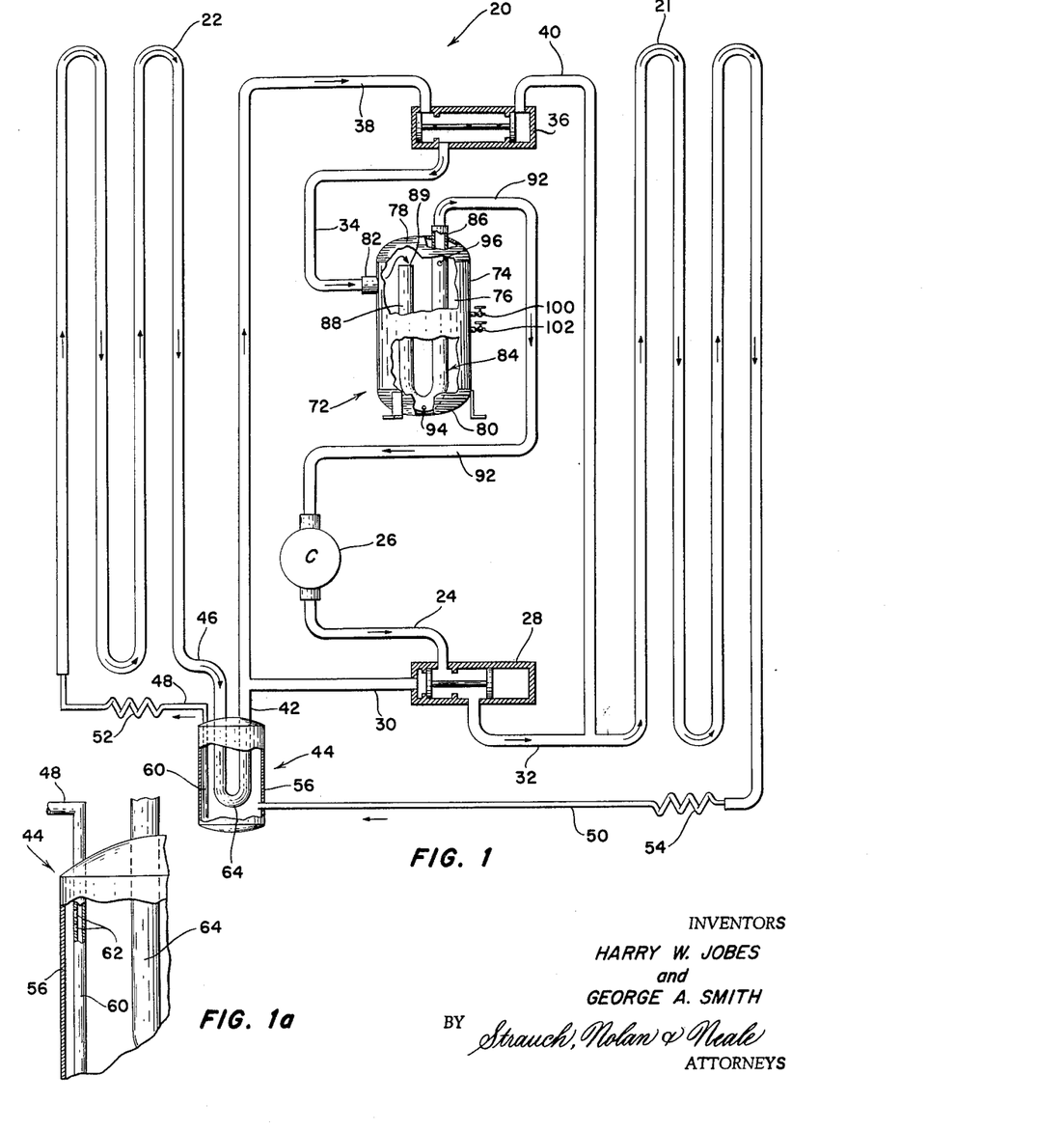
FIGURE 1 is a diagrammatic view of the over-all heat pump system incorporating a stabilizer apparatus according to one embodiment of the present invention with the system being shown on the heating cycle.
FIGURE 1a is an enlarged fragmentary view illustrating details of part of the system shown in FIGURE 1.

Referring now to the drawings and more particularly to FIGURE 1 wherein a preferred construction embodying the principles of the present invention is shown, the reference numeral 20 generally designates a heat pump having conventional indoor and outdoor coils 21 and 22 respectively. In accordance with known practices, fans (not shown) are provided to move air over the coils. Alternatively, either the outdoor coil or indoor coil may be water-cooled. A discharge fluid conduit 24 is connected to the discharge side of a conventional compressor 26 and leads to a change-over valve 28 which is operable to connect conduit 24 alternatively to delivery conduits 30 and 32. A fluid suction conduit 34 for returning refrigerant from the outdoor coil 22 during the heating cycle and from the indoor coil 21 during the cooling cycle is connected to a change-over valve 36. Valve 36 is operable to connect suction conduit 34 alternatively to return fluid conduits 38 or 40. Change-over valves 28 and 36 are of conventional construction and are adapted to be shifted simultaneously by actuators (not shown) to operate the system on the heating or cooling cycles.

If desired, a conventional four-way change-over valve may be used in place of valves 28 and 36 to connect conduits 24, 30, 32, 34, 38 and 40 in the manner previously described.

Conduits 32 and 40 are connected to one side of indoor coil 21 while conduits 30 and 38 are connected to a line 42 leading to one side of a heat exchanger and accumulator assembly 44. The opposite side of assembly 44 is connected by a fluid conduit 46 to the outdoor coil 22. The refrigerant circuit is further formed by liquid lines 48 and 50 containing capillary metering tubes 52 and 54, respectively, with lines 48 and 50 being connected through assembly 44.

With continuing reference to FIGURE 1, assembly 44 comprises a tank 56 which is of elongated cylindrical configuration. Mounted in tank 56 is a vertical dip tube 60 which projects upwardly through the upper end of tank 56 for connection to liquid line 48 in the manner shown. The lower end of dip tube 60 is open adjacent the bottom of tank 56. Radial openings 62 (FIGURE 1a) are provided in dip tube 60 for a purpose to be presently described.

Also mounted in tank 56 adjacent dip tube 60 is a coiled section of tubing 64 having opposite ends projecting upwardly through the top of tank 56 for connection to gas lines 42 and 46 respectively. Tubing 64 is formed with a relatively large diameter to provide a large heat emitting surface within tank 56 for promoting rapid heat exchange between tubing 64 and the contents introduced into tank 56 in which the tubing is immersed. Conduit 50 is connected to tank 56 adjacent the lower end thereof and is in fluid communication with dip tube 60.

Assembly 44, as will presently be explained in greater detail, is operative to accumulate a portion of the refrigerant charge during the heating cycle and to restore the accumulated portion of the charge to the system during the cooling cycle when a large charge is required to be in circulation.

In operation of heat pump 20 thus far described, change-over valves 28 and 36 are illustrated in FIGURE 1 in positions for operating heat pump 20 on the heating cycle with the indoor coil 21 functioning as the condenser and the outdoor coil 22 functioning as the evaporator. Thus, the compressor discharge conduit 24 is connected to conduit 32, the compressor suction conduit 34 is connected to conduit 38 and conduits 30 and 40 are closed. The hot compressed refrigerant gas thus passes to the indoor coil 21 where it is condensed and the liquid passes through capillary tube 54 and is introduced into the bottom of tank 56 through liquid line 50.

As the liquid refrigerant is introduced into tank 56 from line 50, the level of liquid within the tank continues to rise until it covers the openings 62 in dip tube 60. The trapped vapor above openings 62 prevents further accumulation of liquid within tank 56 and the incoming liquid introduced through line 50 thus causes an equal amount of liquid to leave tank 56 through conduit 48 for passage through capillary tube 52 and into coil 22. The liquid introduced into coil 22 is evaporated and returned to compressor 26 through conduit 46, tube coil 64 and conduit 38. Since coil 64 is in the suction line, the gas therein is relatively cool and the temperature in the interior of tank 56 is rapidly decreased, thus reducing the vapor pressure in the tank.

The capacity of tank 56 and the height of openings 62 are selected so that the amount of refrigerant in the system during the heating cycle produces optimum operation of the system.

When the system is operated on the cooling cycle, indoor coil 21 is connected in closed refrigerant circuit as an evaporator and the outdoor coil 22 is connected in the circuit as a condenser by re-positioning change-over valves 28 and 36 to connect compressor discharge conduit 24 to conduct 30 and to connect the compressor suction conduit 34 to conduit 40, thus reversing the gas and liquid flow through the system. Change-over valves 28 and 36 are so arranged as to block flow through conduits 32 and 38 during the cooling cycle. After a brief period of operation on the cooling cycle, tubing 64 within tank 56 becomes hot due to the constant flow of hot gas through it. The portion of the refrigerant within tank 56 in the vapor phase is thus rapidly increased, forcing the liquid refrigerant in tank 56 back into the system.

Figure 2:
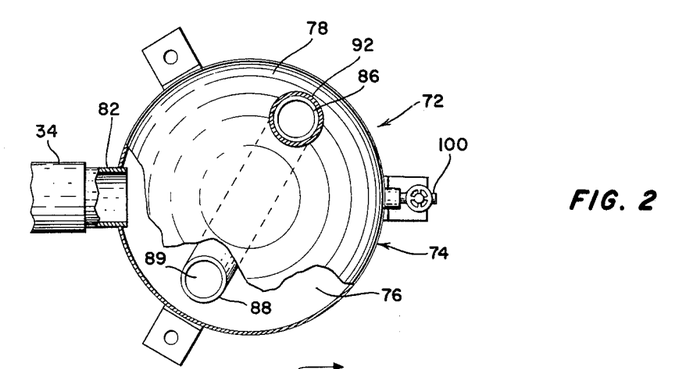
FIGURE 2 is a top plan view of the stabilizer apparatus illustrated in FIGURE 1.
Figure 3:
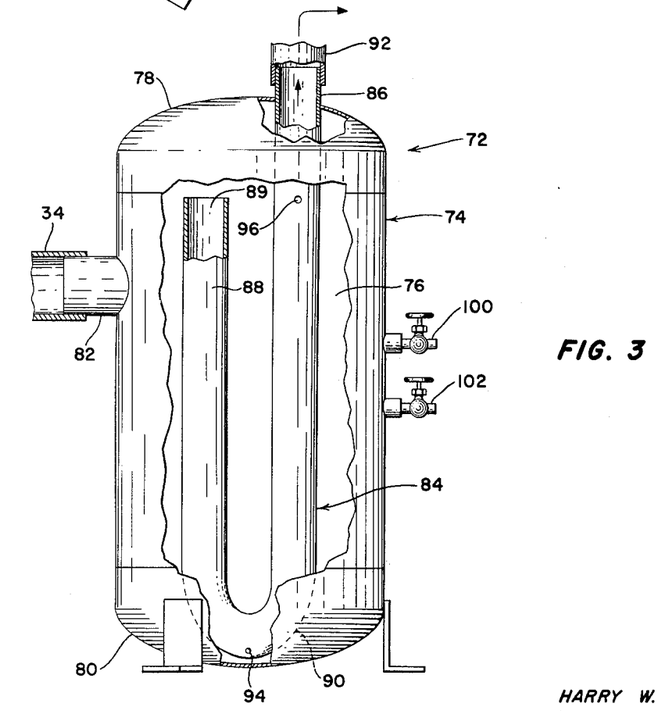
FIGURE 3 is an elevation of the stabilizer apparatus illustrated in FIGURE 2 and illustrating the side wall of the stabilizer tank to be partially broken away to show interior details of the assembly.

With reference now to FIGURES 1-3, a novel liquid stabilizer assembly 72 is connected to suction conduit 34 between change-over valve 36 and compressor 26. Assembly 72 comprises an upstanding tank 74 having a vertically elongated cylindrical configuration and providing a liquid separation and accumulation chamber 76 closed at opposite ends by end plates 78 and 80. A coupling 82 extending laterally through the side wall of tank 74 adjacent the upper end thereof provides the only inlet to chamber 76 and is connected to suction conduit 34 in the manner shown. With this arrangement, therefore, all of the refrigerant removed from the indoor coil 21 during the cooling cycle and from the outdoor coil 22 during the heating cycle passes through suction conduit 34 and into chamber 76.

With continuing reference to FIGURES 1-3, assembly 72 further comprises an upstanding U- or J-shaped conduit section 84 disposed in chamber 76 and having a longer leg portion 86 extending upwardly through the top of tank 74 and a short leg portion 88 integrally joined to the longer leg portion 86 by a curved conduit portion 90 located adjacent to the bottom of the tank. Leg portion 88 terminates in an upwardly facing open end 89 located at a predetermined distance above the chamber inlet provided by coupling 82. Inlet end 89 is in unobstructed fluid communication with chamber 76. The end of leg portion 86 projecting beyond tank 74 is connected to the suction side of compressor 26 by a suction conduit 92 to complete the refrigerant circuit. Conduit 34, tank 74, conduit section 84 and conduit 92 thus serially provide a closed fluid circuit connection between change-over valve 36 and the suction side of compressor 26.

With the heat pump incorporating stabilizer assembly 72 according to the present invention, the closed refrigerant circuit is accurately charged with sufficient refrigerant so that the refrigerant stream leaving coil 21 or 22, when functioning as evaporators, is in the saturated gaseous state at maximum operating load. In this condition, the last portion of refrigerant is vaporized into a gas as close as possible to the evaporator outlet. Under such maximum operating load, therefore, the refrigerant stream being returned to compressor 26 through suction conduit 34 and tank 74 will contain substantially no liquid with all of the evaporation having occurred in coils 21 and 22, when connected in the closed refrigerant circuit as evaporators, thus establishing an ideal condition of maximum efficiency for evaporator performance.

When the load is reduced to a magnitude that is less than the maximum operating load, the immediate effect is that less refrigerant is evaporated. Since the capillary metering tubes 52 and 54 will initially tend to feed the same amount of refrigerant for the reduced operating load as for maximum operating load, some liquid carry-over into suction conduit 34 will temporarily occur. This admixture of liquid and gaseous refrigerant enters chamber 76 through conduit 34 with the result that the heavier liquid droplets in the refrigerant stream will descend by gravity and the lighter gaseous phase will rise.

The dimensions of tank 74 and the relative locations of inlet coupling 82 and the open inlet end 89 of conduit section 84 are so arranged that the vertical velocities of the gas in tank 74 are reduced sufficiently such that the gas does not entrain and support the liquid droplets. The liquid in the refrigerant stream entering chamber 76, therefore will separate from the gaseous phase by gravity and collect in the bottom of tank 74 well below the open inlet end 89 of conduit section 84. The lower part of conduit section 84 including curved portion 90 will be immersed in this separated and collected liquid refrigerant.

As a consequence, it is clear that the spill-over of liquid refrigerant is trapped in chamber 76 and is not carried along with the gaseous refrigerant entering the open inlet end 89 of conduit section 84 at the top of tank 74. Thus, compressor 26 is protected from damage that might occur if the liquid carry-over were otherwise allowed to enter the compressor crankcase along with the refrigerant stream.

Since less refrigerant is now in circulation through the closed refrigerant circuit, both the evaporator and the condenser in the circuit will have more area in use in relation to the refrigerant in circulation and the discharge and suction pressures will decrease. This results in a corresponding reduction of the pressure differential across the capillary metering tubes 52 and 54 being used to feed the evaporator. When the pressure differential across the capillary metering tube is reduced, the flow of refrigerant is reduced to eliminate the liquid spill-over and to effectuate the resumption of the ideal condition where the refrigerant stream leaving the evaporator is in the saturated gaseous state.

If there is a resumption of heavier loads, the liquid level in the system evaporator will drop due to increased evaporation of liquid. This condition temporarily results in warmer than saturated (i.e., superheated) refrigerant gas leaving the evaporator which, in turn, adds heat to the accumulated liquid in tank 74 which is in heat exchange relationship with the refrigerant stream entering chamber 76 and also with the gaseous stream passing through conduit section 84. This added heat thus will vaporize a predetermined proportion of the liquid collected in tank 74 depending upon the degree of superheat which corresponds to the magnitude of the increased load. The refrigerant gas resulting from vaporization of the accumulated liquid will rise and enter the refrigerant circuit through inlet end 89 to thereby increase the charge of refrigerant circulating in the circuit and restore optimum operating conditions where the refrigerant stream leaving the evaporator is in the saturated gaseous state.

Upon shut-down of compressor 26, the refrigerant suction and discharge pressures will begin to equalize and thus tend to cause the liquid in the evaporator to surge over into suction conduit 34. There is also a tendency of liquid refrigerant in the evaporator to migrate toward the compressor due to temperature differences that frequently exist between the evaporator and the compressor. As a result of these pressure equalization and temperature difference factors, refrigerant in the evaporator will tend to continue to flow toward compressor 26 after a shut-down. The liquid in this flow of refrigerant is trapped and collected in tank 74 in the manner previously described to thus prevent harmful amounts of liquid from entering the compressor crankcase or accumulating in the suction line to the compressor where it might be drawn in on start-up to cause damage to the compressor.

Of the known refrigerants, hydrocarbon refrigerants, such as Freon, are particularly preferred. Freon and compressor lubricating oil, particularly mineral oils, are, however, readily mixable in the crankcase of the compressor with the result that some oil will always be carried in admixture with the refrigerant as it is circulated through the system. In returning this admixture of refrigerant and oil through tank 74, the oil combines with the droplets of separated liquid when the gas velocity is reduced to effect the separation of the gaseous and liquid phases. As a consequence, the compressor oil is trapped and accumulates in tank 74 along with the liquid refrigerant.

In order to avoid a harmful depletion of oil in the compresor crankcase as a result of the operation of stabilizer assembly 72 in the system, an orifice 94 of predetermined diameter is formed in the curved portion 90 of conduit section 84 which is usually below the level of liquid refrigerant collected in tank 74. Thus, as gaseous refrigerant flows through conduit section 84, it creates a pressure differential across orifice 94 to establish a relatively small controlled rate of liquid flow into conduit section 84. The liquid entering conduit section 84 through orifice 94 thus will contain a certain proportion of oil which is returned to the compressor crankcase to replenish the oil supply in the crankcase and avoid harmful depletions. In the event that there is little or no liquid refrigerant accumulated in tank 74, the compressor oil will collect in the bottom of the tank and will be sucked through orifice 94 by the gaseous refrigerant flowing through conduit section 84. Orifice 94 is preferably located in the lowest part of the curved conduit portion 90.

The size of orifice 94 is critical since an adequate amount of oil must be returned whereas the liquid refrigerant also returned with the oil cannot exceed a tolerable amount. If the diameter of orifice 94 is made too small, the amount of oil returned to the crankcase of compressor 26 will be insufficient to make up for the losses. If, on the other hand, the diameter of orifice 94 is too large, the amount of liquid refrigerant entering through the orifice will exceed the amount that can be safely handled by the compressor without resulting in damage.

When the level of liquid collected in tank 74 is above orifice 94 after the compressor 26 is stopped, the collected liquid around conduit portion 90 will have a tendency to continue to flow through orifice 94 in an effort to seek its own level in conduit section 84. If this condition develops, the passage through the curved portion 90 of conduit section 84 will become blocked off by the liquid therein. With this flow passage blocked, it has been found that a pressure differential will build up across the column of liquid in conduit section 84 while compressor 26 is shut down. As soon as the pressure differential reaches a sufficient magnitude to support the liquid column in conduit section 84, it will push the liquid up through section 84 and into the crankcase of the compressor in the form of a large slug. This condition is found to cyclically occur until the pressures in the system are finally equalized.

To avoid this undesirable condition, the present invention contemplates the provision of a novel pressure equalizing orifice 96 formed in the upper end of the longer leg portion 86 of conduit section 84 and disposed in tank 74 about on a level with the open end 89 for establishing continuous fluid communication between the interior of conduit section 84 and chamber 76.

When compressor 26 stops, gaseous refrigerant in the upper part of chamber 76 will flow through orifice 96 and into conduit section 84 to quickly equalize the pressure within conduit section 84 with that in chamber 76. As a result, the pressure differential that would cause the accumulated liquid portion in the curved portion 90 of conduit section 84 to rise up is prevented from occurring. The diameter of orifice 96 is required to be accurately sized to allow sufficient gas to bypass the open end 89 of conduit section 84 in order to maintain the equalizing pressure below the magnitude that the pressure will supoprt a liquid column in conduit section 84. On the other hand, the size of orifice 96 cannot be too large since there would then be a tendency to bypass too much gas during operation of compressor 26 and thus reduce the velocity of gas entering through the open inlet end of conduit section 84. Reduction of velocity of the gas flow past orifice 94, in turn, would adversely reduce the amount of liquid and oil drawn in through orifice 94.

From the foregoing, it will be appreciated that the sizes of orifices 94 and 96 are interrelated and are variable with the rated capacity of the system, among other factors. The following table gives the diameters of orifices 94 and 96 discovered to achieve best results for capacites rated from 5 to 25 standard tons of refrigeration:

| Capacity, Tons | Diameter of Orifice 94 in Inches | Diameter of Orifice 96 in Inches | I.D. of Conduit Section 84 in Inches |
|---|---|---|---|
| 5 | 0.096 | 3/16 | 0.785 |
| 8 | 0.096 | 1/4 | 1.025 |
| 10 | 0.096 | 1/4 | 1.265 |
| 17 | 0.125 | 3/8 | 1.505 |
| 25 | 0.141 | 1/2 | 1.985 |

The outside diameter of conduit section 84 is for copper tubing and is preferably sized in accordance with conventional practices to assure that the velocity of gas passing through conduit section 84 is sufficiently high to entrain and atomize oil particles admixed with the liquid flowing through orifice 94 and further to assure that the atomized oil is carried along with the refrigerant stream flowing into the suction side of compressor 26, without being so high as to produce excessive pressure losses. It will be appreciated that the present invention is not limited to the foregoing range of capacities listed in the table above.

While the dimensions of tank 74 may be varied widely to accommodate the needs of different installations, the minimum volume of the tank normally is determined by the amount of liquid refrigerant to be stored in the tank in addition to the necessary gas space at the top of the tank to ensure low velocity transit of gas through the tank and separation of liquid particles from this gas. In a typical 17 ton system, the tank outside diameter is 8⅝ inches and the height is 18 inches. Coupling 82 is connected 12 inches above the bottom of tank 74 and open inlet end 89 of conduit section 84 is disposed above coupling 82.

From the foregoing, it thus is clear that stabilizer assembly 72 performs two important functions in that (1) it protects compressor 26 from possible damage by preventing entry of liquid refrigerant slugs into the suction of the compressor under all conditions of load, normal and abnormal, and whether or not the compressor is actually in operation; and (2) it establishes efficient operation of the evaporator in the closed refrigerant circuit under all conditions of load in that it removes or restores refrigerant to circulation in response to variations in the operating load to keep the refrigerant stream leaving the evaporator in a saturated gaseous state not only for maximum operating loads but also for lighter loads and regardless of how much the load drops off.

While stabilizer assembly 72 will operate to remove or restore the difference in charge in change-over between heating and cooling cycles, the period of time needed to restore the difference to circulation is slower in comparison to the operation of assembly 44. Thus, assembly 44 is advantageously employed in the system along with assembly 72 where it is desired to quickly effectuate the restoration of an accumulated charge when changing over from the heating cycle to the cooling cycle.

In accordance with the present invention, heat pump 20 is charged with refrigerant by first connecting a refrigerant charging tank to the suction side of compressor 26 in the usual manner. Compressor 26 is then started to draw the refrigerant in from the charging tank and the indoor coil 21, functioning as the evaporator, is operated at a zero load by blocking the passage of air normally passing over the surface of the coil. Since no work is being done by the evaporator, liquid refrigerant will rapidly fill the evaporator and will flow over in considerable quantity into tank 74 where it is accumulated in the manner previously described during the charging period, a normal compressor discharge pressure is maintained and the system, as noted above, is operated on the cooling cycle since this cycle normally requires a greater effective refrigerant charge than the heating cycle.

Under the foregoing operation conditions, it has been found that when the accumulated liquid refrigerant reaches a predetermined level in tank 74, the precise amount of charge for achieving the most efficient operation has been introduced into the system. The amount of refrigerant to achieve maximum efficiency in operation is especially critical for the heat pump described herein since, as mentioned before, refrigeration systems employing capillary metering tubes 52 and 54 usually have a relatively low internal volume due to the absence of liquid receivers or reservoirs.

When the liquid accumulating in tank 74 reaches this desired predetermined level, the charging operation is stopped as by blocking off the fluid passage interconnecting the charging tank and suction side of the compressor in the conventional manner. The air then is permitted to again pass over the evaporator surface, thus restoring a load to the evaporator. Upon resumption of load, liquid refrigerant in the evaporator will vaporize and this vaporized refrigerant will flow into tank 74 where it is in heat exchange relationship with the liquid accumulated therein during the charging operation. The transfer of heat from the refrigerant stream entering tank 74 will vaporize the accumulated liquid, as much as is needed to permit refrigerant only in saturated gaseous from to leave the evaporator.

In order to readily determine when the liquid refrigerant has reached the desired predetermined level in tank 74 during the charge operation, vertically spaced apart valved test ports 100 and 102 are connected to tank 74 in communication with chamber 76. The upper port 100 is located slightly above the predetermined liquid level indicating a full charge and the lower port 102 is located slightly below this predetermined level. While the system is being charged and the accumulated liquid in tank 74 has not as yet reached the desired predetermined level, both ports 100 and 102 when opened will release gaseous refrigerant. When the liquid refrigerant reaches the predetermined level between ports 100 and 102, the lower port 102, when opened, will release liquid refrigerant and the upper port 100, when opened, will release gaseous refrigerant. If the charge introduced into the refrigeration circuit exceeds the critical amount needed for efficient operation, both ports 100 and 102 when opened will release liquid refrigerant, thus calling for the removal of part of the charge from the system.

With the foregoing charging method, it is evident that the amount of liquid refrigerant collected in tank 74 provides a precise indication of the amount of charge introduced into the system. In addition, the charge introduced into the system is quickly, easily and accurately determined without having to resort to inaccurate and tedious prior charging methods particularly utilized at the installation site.

It also will be appreciated that the foregoing method may be effectively utilized to determine the amount of refrigerant already in the system. This is effectively accomplished by operating the evaporator at zero or no load in the manner previously described and allowing the overflowing liquid refrigerant to accumulate in tank 74. When a stabilized condition is reached at no load, test ports 100 and 102 are operated as previously described to determine the location of the liquid level in tank 74. As a result, an operator or service man can immediately determine if the system contains the proper amount of refrigerant charge or if the charge is insufficient or excessive.

It is clear from the foregoing that the method of charging and checking the amount of charge already in a system is not limited to heat pumps but is also equally applicable to all refrigeration and air conditioning systems.

Figure 4:
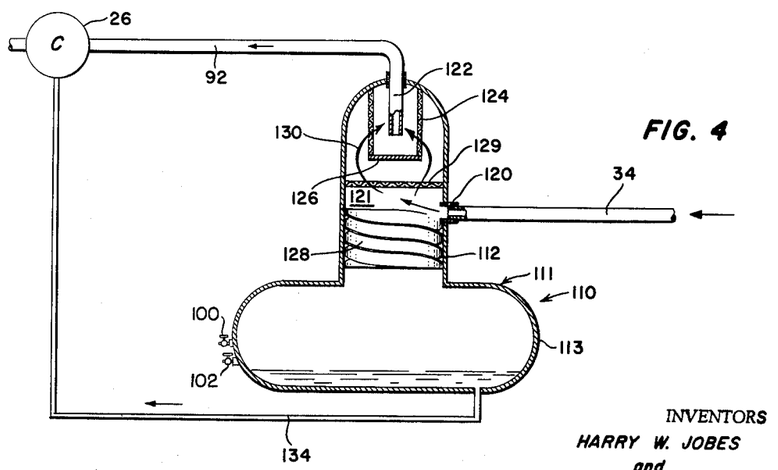
FIGURE 4 is a partially diagrammatic view of a stabilizer apparatus according to another embodiment of the present invention.
Figure 5:
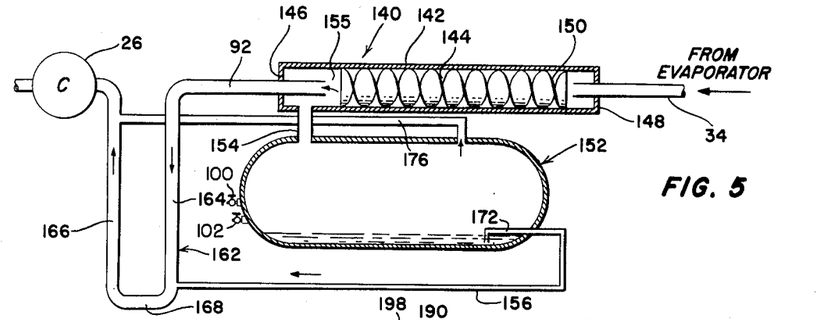
FIGURE 5 is a partially diagrammatic view of a stabilizer apparatus according to still another embodiment of the present invention.
Figure 6:
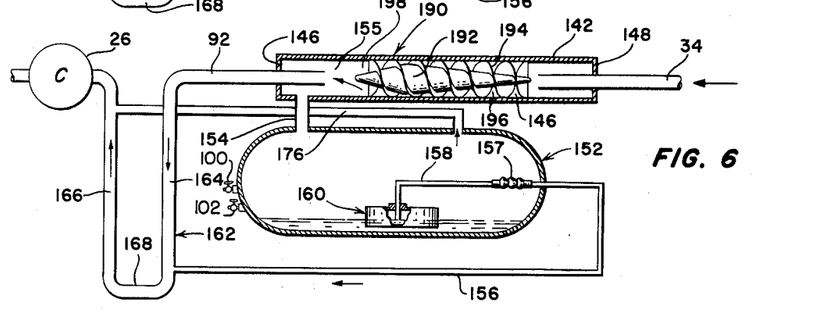
FIGURE 6 is a partially diagrammatic view of a stabilizer apparatus according to a further embodiment of the present invention.

In the embodiments illustrated in FIGURES 4, 5 and 6, like reference numerals designate like parts.

In FIGURE 4, a modified form of stabilizer assembly is illustrated and is generally designated by the reference character 110. Assembly 110 comprises a tank 111 having a vertically elongated cylindrical section 112 in which separation of liquid refrigerant occurs and a storage section 113 opening upwardly into section 112. A coupling 120 extending laterally through the side wall of tank section 112 about midway between the top and bottom thereof provides an inlet to a separation chamber 121 delimited by tank section 112. Conduit 34 is connected to coupling 120 so that all of the refrigerant removed from indoor coil 21 during the cooling cycle and from the outdoor coil 22 during the heating cycle thus passes through suction conduit 34 and into chamber 121.

With continued reference to FIGURE 4, assembly 110 further comprises an outlet conduit 122 extending vertically through the top of tank section 112. Outlet conduit 122 is connected at its outer end to conduit 92 and is open at its inner end within chamber 121 adjacent to the top of tank 111. Surrounding the open inner end of outlet conduit 122 in tank section 112 is a fixed annular perforated screen baffle 124 extending downwardly from the top of tank 111 in concentric surrounding radially spaced relation to the inner end of conduit 122. Baffle 124 projects axially beyond the open inner end of conduit 122 and carries a flat sided unperforated plate 126 at its lower end in a plane passing at right angles to the longitudinal axis of conduit 122 in the manner shown to prevent gases from flowing directly upwardly into the open end of the outlet conduit.

With continued reference to FIGURE 4, a spiral ribbon baffle 128 of uniform diameter is disposed in tank section 112 along a longitudinal axis coaxially aligning with the axis of outlet conduit 124. The diameter of baffle 128 is substantially equal to the internal diameter of tank section 112. Baffle 128 extends downwardly from a region radially adjacent coupling 120 to a region at the lower end of section 112 where it opens into storage section 113. A flat screen baffle 129 extends completely across tank section 112 at right angles to the longitudinal axis thereof and between the inlet connection of conduit 34 to tank 111 and plate 126.

In operation of the system incorporating stabilizer assembly 110, the refrigerant stream flowing through suction conduit 34 enters chamber 121. Baffles 124 and 129 and plate 126 retard the velocity of the gas causing it to follow a sinuous path shown by arrows indicated at 130. The refrigerant stream entering or leaving tank section 112 is caused to flow a sinuous path by spiral baffle 128 to assure complete separation of gaseous and liquid refrigerant. The upwardly flowing gaseous stream of refrigerant passes through screen baffles 124 and 129 and enters the open inlet end of conduit 122 for removal to the suction side of compressor 26. Baffles 124 and 129 are formed with screen interstices of such size as to assure that any liquid globules carried with the upwardly flowing refrigerant stream are caused to flow down toward tank section 113.

The dimensions of tank 112 and the relative locations of the inlet connection of conduit 34 and the open end of outlet conduit 122 together with the arrangement of baffles 124, 126 and 128 with plate 126 are so arranged that the vertical velocity of the gas in tank section 112 does not entrain and support the liquid droplets. The liquid in the refrigerant stream entering chamber 121, therefore, will separate from the gaseous phase by gravity under the velocity impeding action of baffles 124, 126 and 128 and collects in the bottom of tank section 113.

As a result, it is clear than any spill-over of liquid refrigerant is trapped in tank section 113 and is not carried along with the gaseous refrigerant entering through the open end of outlet conduit 122 at the top of the tank 111. Thus, compressor 26 is protected from damage that might occur if the liquid carry-over were otherwise allowed to enter the compressor crankcase along with the refrigerant stream.

Stabilizer assembly 110 functions in the same manner as stabilizer 72 to remove excess refrigerant from circulation during conditions of light load and to restore refrigerant into circulation upon resumption of heavy loads in response to evaporator load variations to thereby establish an optimum refrigerating effect where the refrigerant stream leaving the evaporator is in the saturated gaseous state.

With continued reference to FIGURE 4, an oil recovery conduit 134 is provided for and is connected at one end to the bottom of tank section 113 and at its opposite end to the crankcase of compressor 26. The diameter of conduit 134 is sized to permit liquid and any compressor crankcase oil admixed therewith to be removed by the lower pressure in compressor 26 from tank 111 only at a relatively small controlled rate. This controlled rate as mentioned before in the embodiment of FIGURES 1-3 is sufficient to allow the depleted supply of oil in the compressor crankcase to be adequately replenished but not so large as to permit the introduction of liquid into the crankcase of compressor 26 in such proportions as to be harmful to the compressor.

In FIGURE 5, another modified form of stabilizer assembly is illustrated and generally designated by the reference numeral 140. Stabilizer assembly 140 comprises an elongated tube 142 having an appreciable larger diameter than that of conduits 34 and 92. In this embodiment, the open ends of conduits 34 and 92 are axially spaced apart and extend coaxially into tube 142 from opposite ends thereof.

With continued reference to FIGURE 5, tube 142 delimits a cylindrical separation chamber 144 which is closed at opposite ends by end plates 146 and 148. Slidably and coaxially disposed in chamber 144 is a uniformly diametered spiral ribbon baffle 150 which extends coaxially between the opposed open ends of conduits 34 and 92. Baffle 150 imparts a spiral motion to the refrigerant stream entering chamber 144 from suction conduit 34 to centrifugally displace the heavier liquid particles in the refrigerant stream radially outwardly toward the periphery of tube 142 while permitting the lighter gaseous particles in the refrigerant stream to flow in the region confined to the longitudinal axis of chamber 144.

The liquid refrigerant together with any oil admixed therewith is thus centrifugally separated by baffle 150 and is removed from separation chamber 144 and collected in a stabilizer tank 152. Tank 152 is of horizontally cylindrical elongated shape and disposed vertically below tube 142 in the manner shown. Chamber 144 is connected to the interior of tank 152 by a single conduit 154 which opens into chamber 144 axially downstream of the open inlet end of conduit 92. The separated liquid guided along the periphery of tube 142 passes through an annular chamber mouth 155 concentrically surrounding the open end of conduit 92 and through conduit 154 for collection in tank 152.

As with the previous embodiments, it is clear that liquid refrigerant separated in chamber 144 is trapped and collected in tank 152 to protect compressor 26 against damage that might otherwise occur from the introduction of this liquid into the compressor crankcase. Stabilizer assembly 140 functions in the same manner as stabilizer 72 to remove excess refrigerant from circulation during conditions of light load and to restore refrigerant to circulation upon resumption of heavy loads for establishing the optimum refrigerating effect where the stream leaving the evaporator is in the saturated gaseous state irrespective of changes in the evaporator load.

Assembly 140 may be provided with an oil recovery conduit section 172 shown in FIGURE 5 where oil either is admixed with a liquid refrigerant or is heavier than the liquid refrigerant. As shown, conduit 172 has an open end in tanks 152 adjacent to the bottom thereof for siphoning liquid in the manner previously described. The opposite end of conduit 172 is connected to conduit 156.

If the oil is lighter than the liquid refrigerant, then the oil recovery structure of FIGURE 6 can be used in place of the oil recovery structure shown in FIGURE 5. As shown in FIGURE 6, an oil recovery conduit 156 similarly extends into tank 152 and is connected by a flexible conduit connector 157 to a conduit section 158. Conduit section 158 is carried by a float 160 terminates in an open end closely adjacent to the bottom of float 160 which is apertured. Float 160 rests on the surface of liquid collected in tank 152 in the manner shown. The opposite end of conduit 156 is connected to suction conduit 92 betwee the open inlet end in chamber 144 and the suction side of compressor 26. Since an oil rich mixture is sucked off the surface of the liquid in tank 152 in FIGURE 6, the size of conduit 156 is not critical.

Preferably, conduit 92 is formed with an upstanding U-shaped section 162 having leg portions 164 and 166 connected by a curved conduit portion 168. Oil recovery conduit 156 is connected to the curve conduit portion 168 between legs 164 and 166 and syphons off liquid entering float 160 at a relatively small controlled rate. This syphoned liquid is introduced into conduit 92 for removal to the crankcase of compressor 26 to replenish the depleted supply of lubricant oil.

Float 160 is advantageously employed in systems where the oil tends to float on top of the refrigerant. The inlet open end of oil recovery conduit section 158 positioned in the manner shown thus is effective to syphon off a rich oil mixture from the surface of the liquid refrigerant collected in tank 152.

It should be apparent that the structure associated with either conduit 172 and/or 158 may be used in tank 152 in FIGURE 5 or 6.

In order to assure that oil recovery conduit 158 or 172 does not syphon off the liquid collected in tank 152 upon shut down of compressor 26 in a similar manner described in connection with the embodiment of FIGURES 1–3, a pressure equalizing conduit 176 is connected at one end to tank 152 at the top thereof for communication with the space in tank 152 in which gaseous refrigerant collects. The opposite end of pressure equalizing conduit 176 is connected to leg 166 of conduit section 162. Pressure equalizing conduit 176 functions in the same manner as orifice 96 of the embodiment illustrated in FIGURES 1–3 in that it will equalize the gaseous pressures in tank 152 and in conduit 92 upon shut-down of compressor 26. Conduit 176 is sized to permit only a predetermined controlled rate of gaseous flow from tank 152 to conduit 92 so that a liquid column cannot be supported in conduit section 166.

Referring now to FIGURE 6, the stabilizer assembly illustrated therein is the same as that shown in FIGURE 5 with the exception that lubricant recovery conduit 158 has been used in place of conduit 172 and that baffle 150, which extends through the full diametrical dimension of the cylindrical bore in chamber 144, has been replaced with a modified baffle assembly generally designated at 190 and extending axially between the opposed open ends of conduits 34 and 92. Baffle 190 comprises a streamlined bullet-shaped core 192 and a spiral ribbon baffle 194 mounted on core 192 and having a uniform outer diameter substantially equal to the internal diameter of tube 142.

Core 192 and the tube 142 define an annular fluid flow passage in which baffle 194 is disposed. Due to the shape of core 192, the annular fluid flow passage has a first section 196 of gradually decreasing cross section and a second section 198 of gradually increasing cross section. Section 196 extends from a region axially adjacent to the open end of conduit 34 in chamber 146 to a region about midway between conduits 34 and 92. Section 198 extends from this midregion to a region axially adjacent to the open end of conduit 92 in chamber 146.

With this baffle construction illustrated in FIGURE 6, it has been found that separation of the liquid from the gas in the fluid stream entering chamber 146 is more effective particularly at laminar flow rates.

It will be appreciated that the method of charging the heat pump system and also of determining the amount of charge in the system is applicable to the embodiments illustrated in FIGURES 4–6.

From the foregoing, it will be appreciated that the stabilizer assemblies in each of the embodiments described herein are operative to adjust the refrigerant circulating through the closed refrigerant circuit to permit refrigerant substantially only in saturated gaseous form to leave the evaporator at all operating loads of the evaporator and particularly at the predetermined maximum evaporator operating load. This is accomplished with the stabilizer assembly in combination with effectively doing away with the superheat section of the evaporator coil which conventional forms of coils contain as previously mentioned. It should be noted that in conventional forms of refrigeration systems employing thermal expansion valves, the evaporator is required to have a superheat section since the motivating force for actuating the thermal expansion valve is the temperature difference that exists between the temperature of the superheated gas leaving the evaporator and the temperature corresponding to the saturated vapor pressure in the evaporator.

Therefore, with the present invention, the superheat section of the evaporator coil may be effectively done away with.

Not only the saturation of the gases leaving the evaporator but also the level of the liquid stored in tank 74 are critically determined by the following two factors: (1) the critical size of orifice 94, and (2) the direction of fluid flowing into tank 74. If orifice 94 is too large, liquid will be rapidly removed from instead of being stored in tank 74. Also, fluid entering through conduit 34 cannot be directed into tank 74 so as to create turbulence and thus force the stored liquid out of tank 74. The same factors apply to the embodiments of FIGURES 4–6.

The inventions may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

What is claimed and desired to be secured by United States Letters Patent is:

1. In a refrigeration apparatus having a compressor; a condenser; an evaporator; fluid conduit means forming a closed refrigerant circuit connecting said compressor, said condenser and said evaporator and including a return conduit section connected to said evaporator for removing refrigerant herefrom; and pressure reducing means disposed in said circuit between said condenser and said evaporator for reducing the pressure of condensed refrigerant flowing into said evaporator; the improvement of liquid separating and storage means disposed in said circuit between said evaporator and said compressor and comprising: a closed container having a fluid inlet connected to said return conduit section and disposed at a predetermined distance above the level of liquid to be stored therein; an outlet conduit connected by said circuit to the suction side of said compressor and having an upstanding substantially U-shaped portion disposed in said container, said U-shaped portion having an open inlet end unobstructively communicating with the interior of said container above the level of liquid stored therein, said container being of sufficient length between said open inlet end and the level of liquid contained therein to permit any liquid phase in the refrigerant stream entering said container from said return conduit section to be separated by gravity for collection in said container in surrounding relationship to the lower portion of said U-shaped conduit portion while permitting the gaseous phase of said refrigerant stream to pass through the interior of said container and into said inlet end for removal to said compressor; first means in said U-shaped conduit section adjacent the lower portion thereof below the level of liquid refrigerant stored in said container for continuously admitting small amounts of liquid therethrough for discharge into said outlet conduit at a relatively slow controlled rate during operation of said compressor; and second means in the leg of said U-shaped conduit section disposed in the region of said container where said gaseous phase collects and between said compressor and the portion of said U-shaped conduit section submerged in the liquid in said container for equalizing the gaseous pressures within said container surrounding said U-shaped conduit section and within said U-shaped conduit section upon shut down of said compressor to prevent the build up of a sufficient pressure differential to cause any liquid contained in said U-shaped conduit portion to be lifted into said outlet conduit for flow into the suction side of said compressor.

2. The refrigeration apparatus defined in claim 1 wherein said first and second means each comprises an orifice formed in said U-shaped conduit section and having a predetermined diameter.

3. The refrigeration apparatus defined in claim 2 wherein the diameter of said first means orifice is in the order of 0.096″–0.141″, and the diameter of the second means orifice is in the order of ³⁄₁₆″–½″ for 5 to 25 ton capacities.

4. The refrigeration apparatus defined in claim 1 wherein said separating and storage means is responsive to evaporator load variations in cooperation with said pressure-reducing means and said evaporator to adjust the refrigerant circulating through said circuit to an amount permitting substantially only saturated gaseous refrigerant to leave said evaporator.

5. In a refrigeration apparatus having a compressor; a condenser; an evaporator; and fluid conduit means forming a closed refrigerant circuit connecting said compressor, said condenser and said evaporator and including a return conduit connected to said evaporator for removing refrigerant therefrom; the improvement of stabilizing means connected to said return conduit and comprising a closed container having an upper separation chamber and a lower liquid storage chamber in fluid communication at its upper end with the lower end of said separation chamber, an inlet port communicating with said separation chamber and being connected to said return conduit, an outlet conduit connected to the suction side of said compressor and having an open end located within the upper portion of said separation chamber in spaced relation to said inlet port, and baffle means disposed at least in the fluid path in said separation chamber between said open end of said outlet conduit and said inlet port for reducing the velocity of gases flowing upwardly in said separation chamber toward the open end of said outlet conduit, the velocity of said gases being so reduced as to permit separation of the liquid phase from said refrigerant stream passing from through said separation chamber to the open end of said outlet conduit and allowing said separated liquid phase to descend by gravity into said storage chamber for accumulation therein, and oil recovery conduit means connected to said storage chamber for removing liquid accumulated therein together with any proportions of lubricating compressor oil admixed therewith to said compressor, said baffle means comprises a first perforated member extending between the open end of said outlet conduit and said inlet port and across the path of the refrigerant stream flow towards said open end, a second annular perforated member surrounding the open end of said outlet conduit and a plate carried by said annular perforated member and extending between the open end of said outlet conduit and said first perforated member to divert the upwardly flowing refrigerant stream for flow through said annular perforated member before entering said outlet conduit through said open end.

6. The refrigeration apparatus defined in claim 5 wherein said baffle means further comprises a spiral baffle extending in the path of the refrigerant stream passing from said inlet port into said storage chamber.

7. In a refrigeration apparatus having a compressor; a condenser; an evaporator; and fluid conduit means forming a closed refrigerant circuit connecting said compressor, said condenser, and said evaporator and including a return conduit connected to said evaporator for returning refrigerant to said compressor; the improvement comprising stabilizer means responsive substantially only to evaporator load variations and being operative to separate and remove from circulation through said circuit the liquid phase of the refrigerant stream flowing through said return conduit, said stabilizer means comprising an enlarged section forming a part of said return conduit and defining a separation chamber; baffle means disposed in said separation chamber for effecting the separation of the liquid phase in the refrigerant stream from the gaseous phase thereof; a closed container disposed exteriorly of said separation chamber and return conduit and being connected in fluid communication with said separating chamber for removing and collecting the liquid phase separated in said chamber; and an oil recovery fluid conduit connected at one end to said container at a region adjacent the bottom thereof and normally below the level of liquid collected therein and at the other end to the portion of said return conduit extending between said separation chamber and the suction side of said compressor for continuously returning relatively small measured amounts of collected liquid together with any compressor lubricant oil admixed therewith to said compressor during operation thereof.

8. The refrigeration apparatus defined in claim 7 comprising a fluid equalizing conduit connected in said circuit for equalizing the fluid pressures in said container and the portion of return conduit downstream of said other end of said oil recovery conduit upon shutdown of said compressor to prevent the build up of a sufficient pressure differential to cause any liquid contained in said oil recovery conduit to be forced into said compressor.

9. In a refrigeration apparatus having a compressor; a condenser; an evaporator; and fluid conduit means forming a closed refrigerant circuit connecting said compressor, said condenser, and said evaporator and including a return conduit connected to said evaporator for returning refrigerant to said compressor; the improvement comprising stabilizer means responsive substantially only to evaporator load variations and being operative to separate and remove from circulation through said circuit the liquid phase of the refrigerant stream flowing through said return conduit, said stabilizer means comprising an enlarged section forming a part of said return conduit and defining a separation chamber; baffle means disposed in said separation chamber for effecting the separation of any liquid phase in the refrigerant stream from the gaseous phase thereof; and a closed container disposed exteriorly of said separation chamber and return conduit and being connected in fluid communication with said separating chamber for removing and collecting the liquid phase separated in said chamber, said baffle means comprising a spiral ribbon baffle disposed longitudinally in said separation chamber for causing the liquid phase of said refrigerant stream to be centrifugally displaced to the peripheral region thereof while permitting the gaseous phase to flow along a path confined to the longitudinal axis thereof.

10. The refrigeration apparatus defined in claim 9 wherein said spiral ribbon baffle is mounted on a streamlined bullet-shaped fluid guide core disposed coaxially between the inlet and outlet of said chamber.

11. In a refrigeration apparatus having a compressor; a condenser; an evaporator; and fluid conduit means forming a closed refrigerant circuit connecting said compressor, said condenser, and said evaporator and including a return conduit connected to said evaporator for returning refrigerant to said compressor; the improvement comprising stabilizer means responsive substantially only to evaporator load variations and being operative to separate and remove from circulation through said circuit the liquid phase of the refrigerant stream flowing through said return conduit and comprising an enlarged section forming a part of said return conduit and defining a separation chamber; baffle means disposed in said separation chamber for effecting the separation of any liquid phase in the refrigerant stream from the gaseous phase thereof; and a closed container disposed exteriorly of said separation chamber and return conduit and being connected in fluid communicaton with said separating chamber for removing and collecting the liquid phase separated in said chamber, said baffle means comprising a spiral ribbon baffle disposed longitudinally in said separation chamber for causing the liquid phase of said refrigerant streams to be centrifugally displaced to the peripheral region thereof while permitting the gaseous phase to flow along a path confined to the longitudinal axis thereof, said chamber having a cylindrical bore with the spirals of said baffle extending through the full diametrical dimension of said bore.

References Cited by the Examiner
UNITED STATES PATENTS

| | | | |
|---|---|---|---|
| 1,746,406 | 2/1930 | Sawyer | 62—503 X |
| 2,156,426 | 5/1939 | Brown et al. | 62—512 |
| 2,162,537 | 6/1939 | Peo | 62—77 |
| 2,181,854 | 11/1939 | Anderson et al. | 62—77 |
| 2,512,869 | 6/1950 | McBroom et al. | 62—503 |
| 2,698,522 | 1/1955 | La Porte | 62—503 X |
| 2,787,135 | 4/1957 | Smith | 62—513 X |
| 2,859,596 | 11/1958 | Evans | 62—503 X |
| 2,882,698 | 4/1959 | Boyle | 62—503 X |
| 2,945,355 | 7/1960 | Boling | 62—503 |
| 2,990,698 | 7/1961 | Crotser | 62—503 |
| 3,009,335 | 11/1961 | Alsing | 62—503 X |
| 3,012,414 | 12/1961 | La Porte | 62—503 |
| 3,021,693 | 2/1962 | Aune | 62—513 X |
| 3,060,704 | 10/1962 | Miller | 62—503 |
| 3,084,523 | 4/1963 | Bottum et al. | 62—503 X |
| 3,108,453 | 10/1963 | Tinkey | 62—513 X |
| 3,110,164 | 11/1963 | Smith | 62—512 X |

ROBERT A. O'LEARY, *Primary Examiner.*

LLOYD L. KING, *Examiner.*